United States Patent

[11] 3,614,309

[72] Inventor Biagio S. Presti
Bloomington, Ind.
[21] Appl. No. 787,115
[22] Filed Dec. 26, 1968
[45] Patented Oct. 19, 1971
[73] Assignee Sarkes Tarzian, Inc.
Bloomington, Ind.

[54] APPARATUS FOR RECORDING AND REPRODUCING SINGLE FRAME VIDEO IMAGES ON A PLURAL TRACK RECORD
7 Claims, 7 Drawing Figs.

[52] U.S. Cl. .......... 178/6.6 DD, 179/100.2 MD
[51] Int. Cl. .......... G11b 21/08, H04n 5/78
[50] Field of Search .......... 178/6.6 A, 6.6 DD; 179/100.2 MD; 340/174.1 C

[56] References Cited
UNITED STATES PATENTS 2,955,157 10/1960 Young .......... 178/6.6
3,243,788 3/1966 Maclay .......... 340/174.1
3,501,584 3/1970 Machein et al. .......... 179/6.6

*Primary Examiner*—Bernard Konick
*Assistant Examiner*—J. Russell Goudeau
*Attorney*—Mason, Kolehmainen, Rathburn & Wyss

ABSTRACT: A large number of video images are stored upon the surface of a rotating magnetic drum. Image storage is carried out by applying an image bearing video signal to a stationary recording head positioned adjacent the drum surface. Individual images are stored in circumferential bands axially displaced from one another and distributed over the entire drum surface. The drum is equipped with two independently positionable reproducing heads. These two heads are mounted on opposite sides of the drum and are arranged to generate signals that are electrically synchronized so that one head may be moved to select a new image while the other head is utilized to display a previously selected image, thereby providing for rapid selection of different images in the manner of a conventional slide projector for still slides.

Inventor:
Biagio S. Presti
By Mason, Kolehmainen, Rathburn & Wyss
Att'ys

Inventor:
Biagio S. Presti
By Mason, Kolehmainen, Rathburn & Wyss
Attys

Inventor:
Biagio S. Presti
By Mason, Kolehmainen, Rathburn & Wyss
Attys

Inventor:
Biagio S. Presti
By Mason, Kolehmainen, Rathburn & Wyss
Att'ys

Inventor:
Biagio S. Presti
By Mason, Kolehmainen, Rathburn & Wyss
Attys

APPARATUS FOR RECORDING AND REPRODUCING SINGLE FRAME VIDEO IMAGES ON A PLURAL TRACK RECORD

This invention relates to signal recording and reproducing systems, and more particularly to a system for the recording, storage and reproduction of video still images.

The current practice is to record video still images on photographic film, and to convert the resulting photographic images into electronic images by placing them before a television camera. If a series of video still images are to be transmitted, the custom at present is to employ an individual television camera for each image and to electronically switch from one camera to another, or alternatively to employ a single camera and to optically switch the camera field of view from one image to another.

One popular device for storing and reproducing video images is called a video slide projector. This device includes a single television camera, two magazines containing photographic slides, and an optical switching arrangement for switching the camera field of view from one magazine to the other. When a slide from one of the two magazines is within the camera field of view, the other magazine is repositioned to bring the next slide into position. The optical switching arrangement is then activated to switch the camera field of view from the one slide to the next.

Photographic image storage is undesirable for several reasons. Photographic film must be processed before images can be displayed. Since film processing takes time, photographic images cannot be reproduced for some time after they are first recorded. Photographic transparencies are sensitive to heat, and they easily pick up finger marks and dust. Additionally, reproduction of photographic images requires conversion of the images from optical to electronic form.

These disadvantages can all be overcome by storing video images electronically either on magnetic tape, or on the surface of a magnetic disc or drum. Although the art of recording images magnetically is quite advanced, there has yet to be developed a magnetic image recording system which can provide rapid and totally random access to a large number of video images stored in a common storage location.

It is desirable to obtain a video image recording apparatus having a single magnetic memory, and equipped with two independent image retrieval systems each of which has random access to the entire memory. The two retrieval systems should be independently operable, so that the image retrieved by the one system can be viewed while the other system is adjusted to retrieve another image. The two retrieval systems should each be able to generate an image bearing video signal, and synchronizing pulses of the two image bearing video signals should be phased so that switching between the two signals does not cause a television receiver raster to tear horizontally or to roll vertically.

Accordingly, a primary object of the present invention is the production of a video image recording apparatus that can store a large number of video images in a single magnetic memory, and that can retrieve the images rapidly and in any desired random order.

A further object of the present invention is the production of video image recording apparatus that can reproduce images immediately after they are recorded, that does not require an image to be converted between electronic and photographic forms, that can switch between successive images far faster than can be done with an optical system, and that has a greater image storage capacity than the usual optical slide projector.

Another object of the present invention is the production of a video still image recording apparatus that can accept video information from any conventional video source including sources having motion, such as a live telecast or a telecast that has been previously recorded on video tape.

An additional object of the present invention is the production of a video image reproducing apparatus that includes two independently operable image retrieval systems each of which has access to all of the images in the memory, and each of which can generate a complete image bearing video signal. Preferably the two image bearing video signals should be synchronized both horizontally and vertically so that switching from one to the other will not cause receiver roll or tear.

Briefly, a preferred embodiment of the present invention comprises a magnetic drum recorder that can record a large number of video images, and that can then reproduce the recorded images in any desired order.

The image recording process is carried out as follows: A video signal containing all the information needed to reproduce the image is applied to a stationary magnetic recording head mounted adjacent the surface of the spinning magnetic drum. The stationary recording head generates a magnetic record of the image upon the surface of the spinning drum. This image record is confined to a narrow circumferential belt that encircles the drum exactly once. Other images are recorded in a like manner, but the recording head is moved to a new location along the drum axis before each new image is applied to the magnetic surface. When the recording process is complete, the magnetic drum is encircled by a series of magnetic images, each image occupying a narrow circumferential band along the length of the drum surface. Drum rotation speed and phase are carefully controlled so that the horizontal synchronizing pulses accompanying each image are uniformly spaced about the perimeter of the drum.

Image reproduction is accomplished by positioning a reproducing head before a stored image and then utilizing the signal recovered by this head as a video output signal. Two or more independently positionable heads can be used. If two heads are used and if each video image includes two interlaced fields, the two heads may be arranged to recover signals that are vertically synchronized. This is done by mounting the two heads on opposite sides of the drum from one another. Since each interlaced image record will include two vertical synchronizing pulses located on opposite sides of the drum from one another, the two heads recover vertical synchronizing pulses from the drum surface substantially simultaneously, and the signals recovered by the two heads are vertically synchronized. The recovered signals can also be synchronized horizontally, if desired, by incrementally shifting the heads while monitoring the recovered signals with a multiple channel oscilloscope or other suitable device. Since the horizontal synchronizing pulses of the images are aligned angularly, once the heads are positioned to recover signals that are horizontally synchronized, synchronization cannot be lost by shifting the heads from one image to another. A rapid, roll and tear free image change can then be carried out by electronically switching between the heads. Both heads have access to all of the images stored upon the drum surface, so the images may be reproduced in any random order.

The invention, both as to its organization and method of operation, together with further objects and advantages thereof, will best be understood by reference to the following specification taken in connection with the accompanying drawings, in which.

Figure 1:
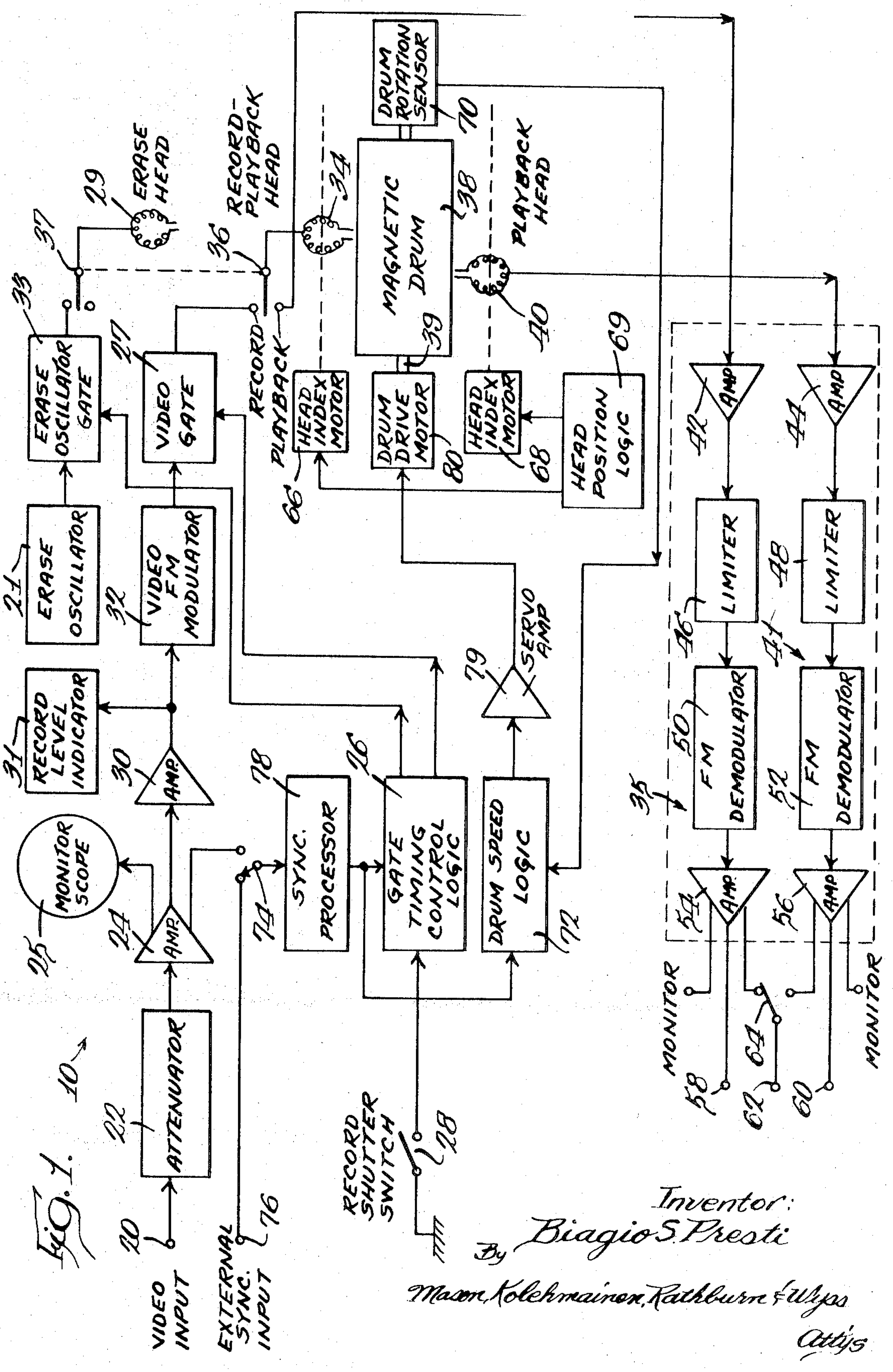
FIG. 1 is a block diagram of a video image recording apparatus embodying the principle of the present invention.

Referring now to the drawings, a video image recording and reproducing system embodying the present invention is indicated at 10 in FIG. 1. The storage element in this recording system is a rotating magnetic drum 38 that is able to store images in the form of magnetic impressions. The magnetic record of each stored image forms a band that completely encircles the drum 38. By keeping these bands narrow it is possible to store a large number of images upon the single drum 38.

A record-playback head 34 and a playback head 40 are mounted adjacent the surface of the spinning drum 38 on opposite sides of the drum from one another. These two heads 34 and 40 may be indexed or positioned so as to be adjacent any of the locations upon the drum 38 surface where images can be stored. Head positioning is performed by the two head indexing motors 66 and 68 under the control of the head position logic circuitry 69. Additional heads may be provided for special purposes, if desired.

Each of the two heads 34 and 40 is equipped with a complete playback amplification and demodulation system 35 and 41 so that two images may be retrieved from storage simultaneously. The signals retrieved by the head 34 are passed through a record-playback switch 36, an amplifier 42, a limiter 46, and FM demodulator 50, and an output amplifier 54 to a first video output terminal 58. The signals retrieved by head 40 are passed through an amplifier 44, a limiter 48, and FM demodulator 52, and an output amplifier 56 to a second video output terminal 60. A third video output terminal 62 is connected to either of the two amplifiers 54 or 56 by a switch 64, preferably a fast acting electronic switch. Monitor outputs 63 and 65 from the amplifiers 54 and 56 may also be provided. The playback amplification and demodulation systems 35 and 41 used in this device may be identical to the playback amplification and demodulation systems used in conventional magnetic video recorders, as will be readily understood by those skilled in the art.

The head 34 is also used for recording, although a separate record head may be provided if desired. The video signal to be recorded is applied to a video input terminal 20, and is then passed through an attenuator 22 and an amplifier 24. The output of the amplifier 24 may be displayed upon a conventional video monitor scope 25. The signal is then further amplified by an amplifier 30, the output of which may be connected to a conventional record level indicator 31. The signal is then passed through a conventional video FM modulator 32. Up to this point, the recording system is no different from the recording system found in any conventional magnetic video signal recording device. Frequency modulation is optional, and some other form of modulation may be used if desired.

Figure 5:
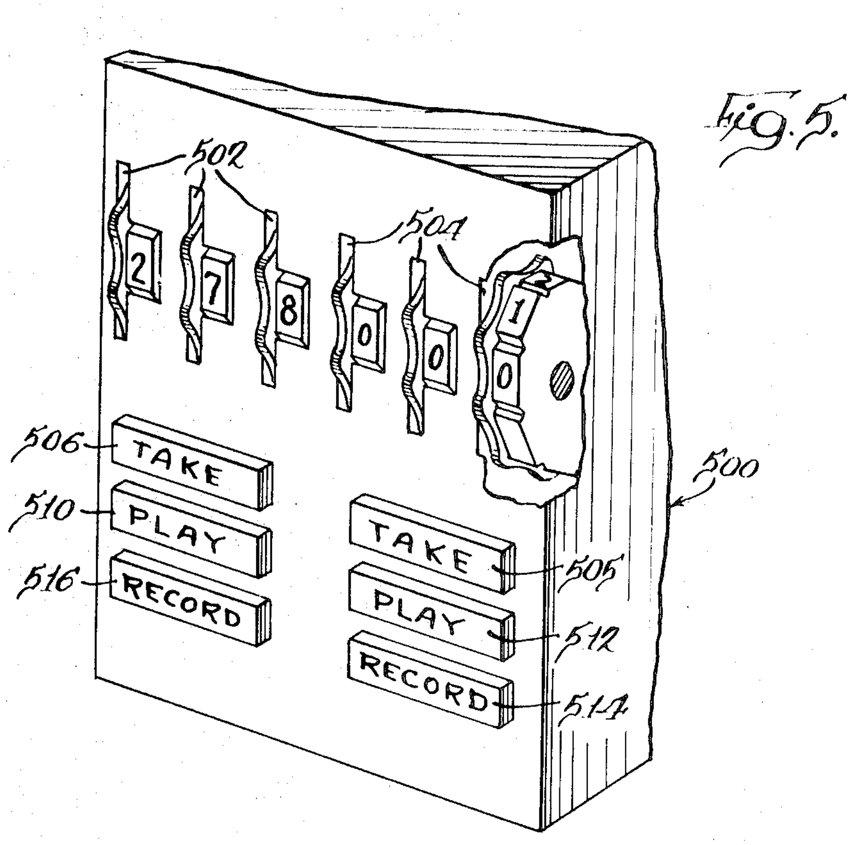
FIG. 5 is a perspective view of a control panel suitable for use with the apparatus of FIG. 1, partially in section.

The signal coming from the frequency modulator 32 is passed through a video record gate 27 and a record-playback switch 36, and is fed to the recording playback head 34. When the switch 36 is in the RECORD position and the jointly actuatable switch 27 is closed so that signals are transmitted therethrough, the input video signal is applied directly to the record-playback head 34 and is recorded upon the surface of the magnetic drum 38. The record-playback switch 36 is in the RECORD position and the switch 27 is closed whenever RECORD buttons 511 and 514 (FIG. 5) are depressed, but the video record gate 27 (FIG. 1) is normally open. The gate 27 closes only momentarily during the recording process.

A record shutter switch 28 initiates the image recording process. The switch 28 also closes when the RECORD buttons 511 and 514 (FIG. 5) are depressed. When the switch 28 closes, a gate timing control logic circuit 26 applies exactly one frame of video to the surface of the magnetic drum by closing the video record gate 27 for exactly the time it takes to transmit one compete video image. The drum 38 rotates exactly one revolution during this time interval, and the resulting magnetic record forms a substantially closed belt about the circumference of the magnetic drum 38.

The gate timing control logic circuit 26 also erases any old information from the surface of the drum 38 by closing an erase oscillator gate 33, and by keeping the gate 33 closed for one complete revolution of the drum 38. The closure of the gate 33 results in the application of an erase signal to an erase head 29. The erase head 29 is preferably adjacent the surface of the drum 38 slightly ahead of the record-playback head 34. The erase signal is generated by an erase oscillator 21.

The exact timing sequence in which the above-mentioned events occur is as follows: first, the record shutter switch 28 is manually closed. At the beginning of the next complete image the erase oscillator gate 33 closes. After a brief time interval, the video record gate 27 closes. At the beginning of the next complete image, the erase oscillator gate 33 opens, and after the same brief time interval, the video record gate 27 opens, A particular gate timing control logic circuit 26 for causing the gates 27 and 37 to function as described above will be discussed in more detail below. Any suitable gate timing control logic circuit may be used, so long as it can erase the old image and record one complete frame of the new image.

Sychronizing signals needed for operation of the image recorder are supplied by a sync processor circuit 78. Depending upon the position of a switch 74, the sync processor 78 derives synchronizing signals either from an external synchronizing signal source connected to an external sync input terminal 76, or from the video signals appearing at the output of the amplifier 24. Both horizontal and vertical synchronizing signals or pulses are supplied by the sync processor circuit 78. The sync processor circuit 78 can be identical to the sync processor circuits found in ordinary television apparatus, and will not be discussed in detail.

The video signals at the outputs of the amplifiers 54 and 56 may be synchronized both horizontally and vertically. However, this is not necessary when switching from one image to another is accomplished by the switch 64 during the vertical retrace interval of the new image since the receivers which are being supplied with these signals will have substantially the entire retrace interval to recover. If control of the switch 64 is completely random, then it is desirable to synchronize both vertical and horizontal signals of all images to suppress vertical rolling and horizontal tearing that might otherwise occur in receivers connected to the third output terminal 62 when the switch 64 is thrown. Vertical synchronization is achieved when the heads 34 and 40 recover vertical synchronizing pulses from the surface of the drum 38 simultaneously. Horizontal synchronization is achieved when the heads 34 and 40 recover horizontal synchronizing pulses from the surface of the drum 38 simultaneously.

For vertical synchronization, the images are recorded upon the drum 38 with their vertical synchronizing pulses angularly aligned. In the usual case of interlaced scanning, each image will include two such vertical synchronizing pulses located on opposite sides of the drum 38 from one another. When these pulses are angularly aligned, they form two straight lines parallel to the drum axis and located in opposing sides of the drum. Angular alignment of the vertical synchronizing pulses is achieved by phase of the rotation of the drum 38 with the occurrence of vertical synchronizing pulses accompanying the signal to be recorded. The drum speed logic circuitry 72 performs this task, as will be explained below. The two heads 34 and 40 are mounted on opposing sides of the drum 38, so that when one line composed of vertical synchronizing pulses is below the head 34, the opposing line composed of vertical synchronizing pulses is simultaneously below the head 40. In this manner, the heads 34 and 40 are able to recover vertical synchronizing pulses simultaneously.

Horizontal synchronization is achieved in much the same manner. The rotation of the drum 38 is phase locked with the occurrence of horizontal synchronizing pulses accompanying the signal to be recorded. Again this is done by the drum speed logic circuitry 72, as will be explained below. The horizontal synchronizing pulses form 525 lines about the periphery of the drum 38. One of the two heads 34 or 40 is shifted slightly until the two heads recover horizontal synchronizing pulses simultaneously. A multiple trace oscilloscope connected to the first and second outputs 58 and 60 can be used to check horizontal synchronization. Full synchronization is desirable, but may not be necessary even with random operation of the switch 64.

Figures 2, 3:
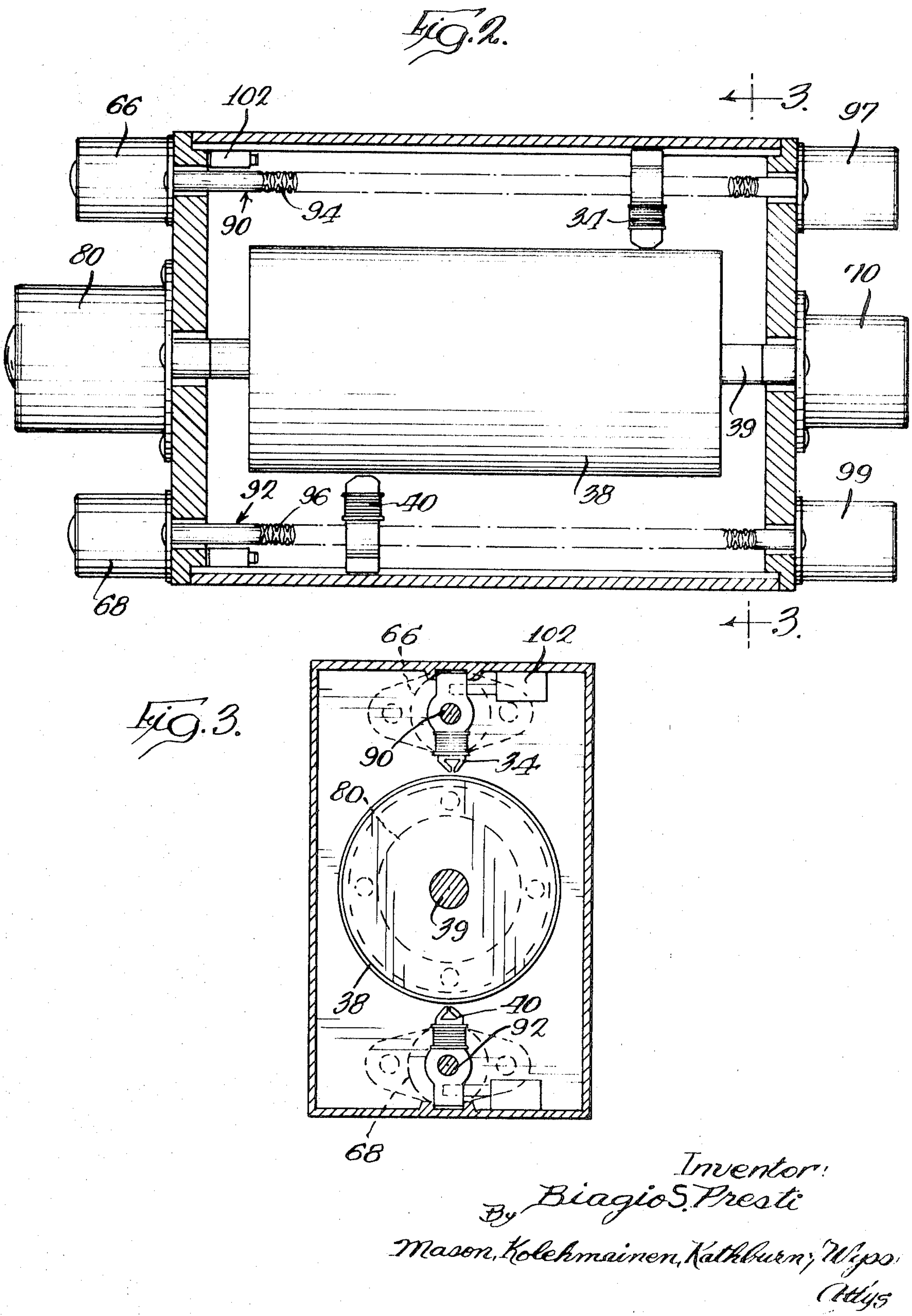
FIG. 2 is an elevational sectional view of a magnetic drum suitable for use with the apparatus of FIG. 1.
FIG. 3 is a sectional view taken along the line 3—3 in FIG. 2.

FIG. 2 and 3 show the mechanical details of the drum and head assembly. One end of the drum 38 central shaft 39 is connected to the drum drive motor 80 and the other end of the shaft 39 is attached to the drum drive motor 80 and the other end of the shaft 39 is attached to the drum rotation sensor 70. The two head indexing motors 66 and 68 are mounted respectively above and below the drum drive motor 80. Each of the head positioning motors 66 and 68 drives an elongated head positioning screw respectively indicated at 90 and 92. The two head positioning screws each extend the full length of the drum 38 in a direction parallel to the drum axis. Each of the two motors 66 and 68 includes suitable gearing so that the head positioning screws 90 and 92 are rotated at a relatively slow speed. This gearing improves the accuracy of the head positioning mechanism by insuring that several motor armature revolutions are required to shift a head from one image to the next.

The two-head positioning screws 90 and 92 respectively carry two grooves 94 and 96 that spiral from one end of the screws to the other and that then spiral back upon themselves to the start of the screws. The two heads 34 and 40 are attached respectively to the two screws 90 and 92, and engage the grooves 94, and 96 in such a manner that energization of the positioning motors 66 and 68 will cause the two heads 34 and 40 to move continuously back and forth over the surface to the magnetic drum 38 in a direction parallel to the drum axis. This is a commonly used form of mechanical drive, and the details of this form of drive are well understood in the art. Any equivalent arrangement for shifting the magnetic heads axially over the drum surface may be substituted for the arrangement described above. For example, a numerically controlled point-to-point positioning system such as those used in the machine tool industry can be used. Such systems generally utilize electrohydraulic stepping motors that advance or retard a lead screw by increments in response to electrical pulses. Many different head positioning systems are currently on the market and may be purchased from manufactures of magnetic drum memory systems which are used in computers and other similar devices.

Figure 4:
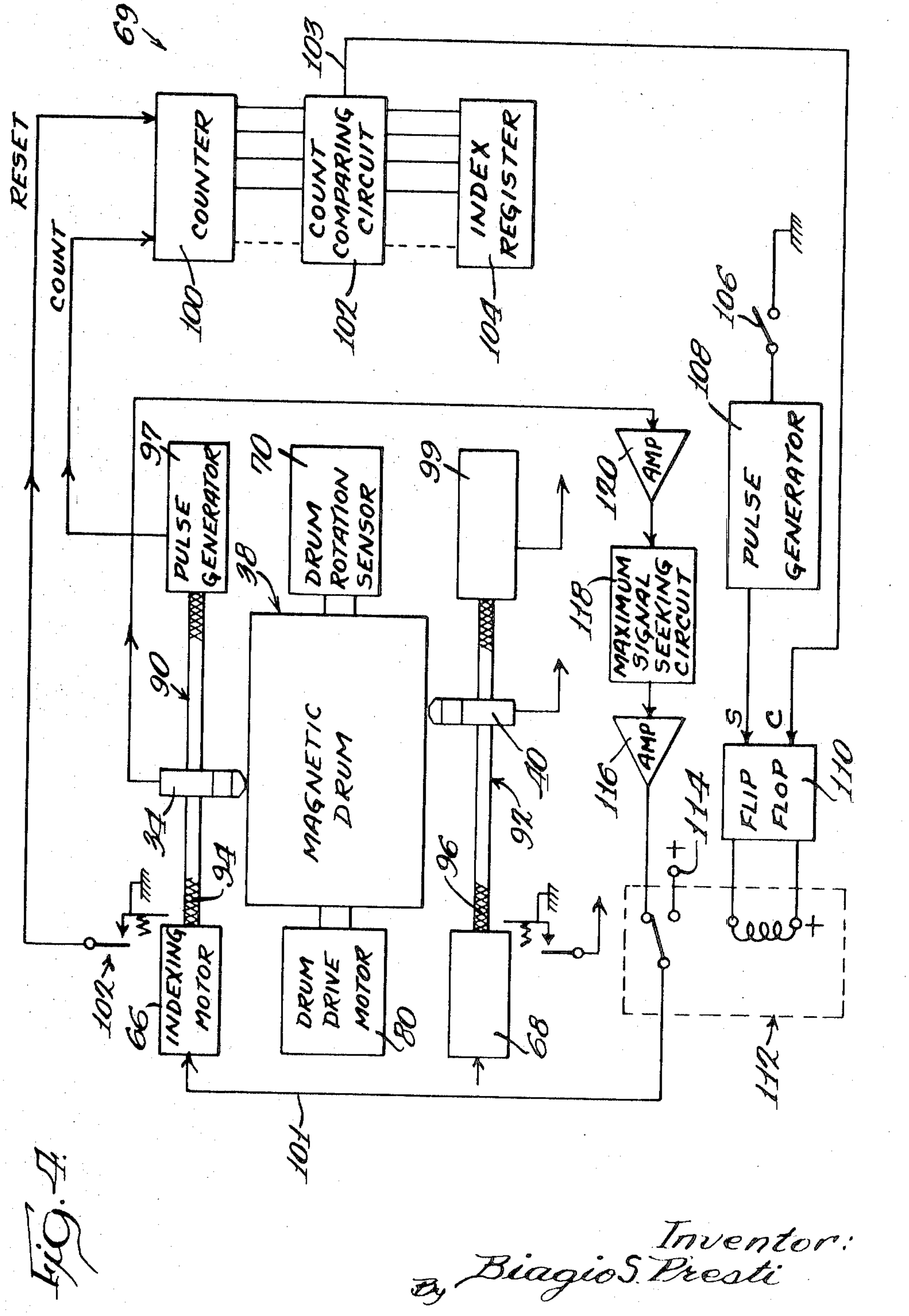
FIG. 4 is a diagrammatic representation showing the head positioning apparatus and also showing head positioning logic circuitry suitable for use with the present invention.

FIG. 4 is a diagrammatic representation showing the details of the head position logic circuitry 69 (FIG. 1). Only those elements of the circuitry 69 used to position the head 34 are shown in FIG. 4. The elements of the logic 69 used to position the head 40 are assumed to be identical to those shown.

A pulse generator 97 is attached to one end of the screw 90. This pulse generator 97 generates a fixed number of pulses with each revolution of the positioning screw 90. The pulses generated by the pulse generator 97 are fed into the COUNT input of an electronic counter 100. The counter 100 also includes a RESET input which resets the counter to zero when connected to ground.

Assume for the moment that the indexing motor 66 is continually energized so that the head 34 moves continuously back and forth along the shaft 90. Each time the head 34 reaches the far left end of the positioning screw 90 it closes a microswitch 102. The microswitch 102 resets the counter 100 to zero by connecting the RESET input of the counter 100 to ground. The counter 100 is not permitted to count again until the microswitch 102 opens one more.

As the head 34 moves once again to the right, the microswitch 102 opens and the counter 100 begins to count the pulses generated by the pulse generator 97. Since the number of pulses generated by the pulse generator 97 is proportional to the distance which the head 34 has moved along the screw 90, the number stored in the counter 100 at any moment may be use as an indication of the position of the head 34. The number of pulses generated by the pulse generator 97 per revolution of the screw 90, and also the pitch of the spiral grooves 94 upon the screw 90, are jointly chosen to insure that one pulse is generated each time the head 34 is moved from a position before one stored image to a position before the next. The total count on the counter 100 then can be used as an indication of which image the head 34 is near.

The indexing motor 66 is connected by a line 101 either to the output of a servoamplifier 116, or to a positive potential point 114, depending upon the state of a relay 112. A flip-flop 110 controls the relay 112. When the flip-flop 110 is set, the relay 112 is energized, and the indexing motor 66 is connected to the positive potential point 114. When the flip-flop 110 is cleared, the relay 112 is deenergized, and the indexing motor 66 is connected to the output of the servoamplifier 116.

In actual operation, a number corresponding to the image which is to be reproduced is manually placed in an index register 104. A head positioning switch 106 is then manually closed. Closure of the switch 106 causes a pulse generator 108 to generate a pulse that is applied to the set or "S" terminal of the flip-flop 110, setting the flip-flop 110. The flip-flop 110 in turn energizes the relay 112, and the relay 112 connects the indexing motor 66 to the positive potential point 114. The indexing motor 66 begins to drive the head 34 back and forth along the screw 94.

A count comparing circuit 102 compares the number stored within the counter 100 to the number within the index register 104. When these two numbers are equal, the count comparing circuit 102 generates a pulse on a line 103 that connects to the clear or "C" terminal of the flip-flop 110, clearing the flip-flop 110. The relay 112 now disconnects the indexing motor 66 from the positive source of potential 114 and connects it to the servoamplifier 116.

The servoamplifier 116 amplifies an output signal received from a maximum signal seeking circuit 118 that is connected to the signal output of the head 34 by an amplifier 120. The maximum signal seeking circuit 118 continues to energize the motor 66 until the signal received by the head 34 reaches a maximum. This insures that the head 34 is positioned directly over the point on the magnetic drum surface where the magnetically stored image is the strongest. The details of the maximum signal seeking circuit 118 are well known in the art, since such circuits are widely used for automatic tuning of automotive radios and the like. The maximum signal seeking circuit may be omitted if the positioning system is otherwise sufficiently accurate.

The above arrangement is only one of many ways in which head positioning can be accomplished. Alternatively, for example, magnetic index marks can be applied to the drum surface and used to determine head positioning. Any other suitable head positioning arrangement can be sued in connection with the present invention.

Figure 6:
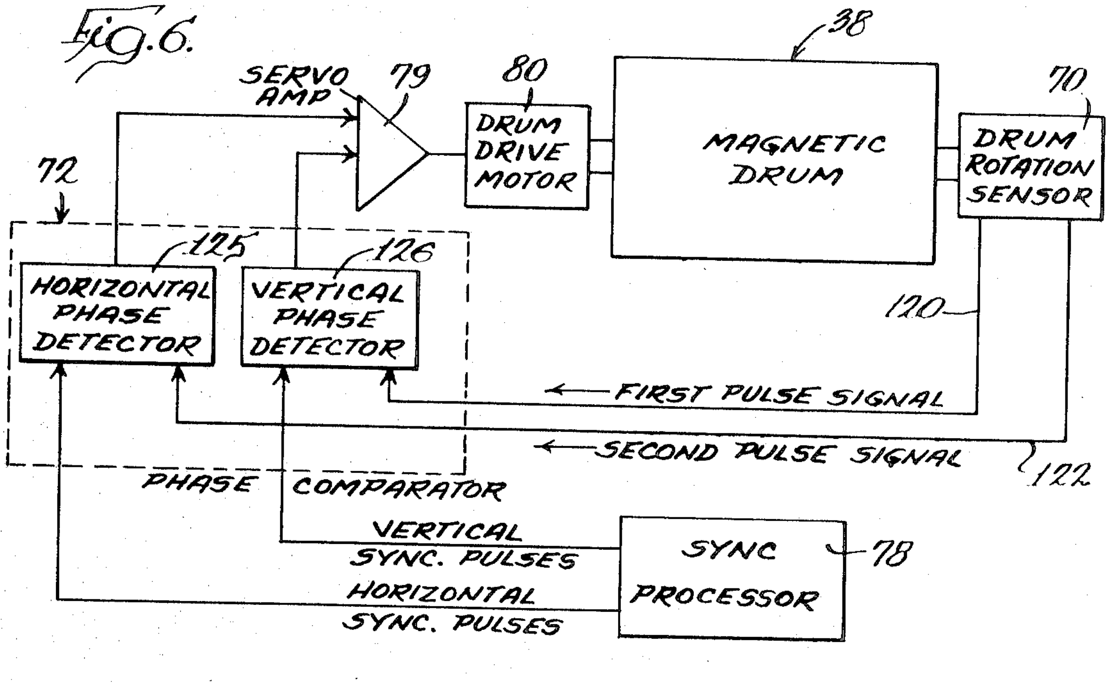
FIG. 6 is a block diagram showing the circuitry for controlling rotation of the drum included in the apparatus shown in FIG. 1.

FIG. 6 shows one possible control panel arrangement 500 which may be used in connection with the system of FIG. 1. This panel arrangement 500 provides two independent sets of controls for positioning the reproducing heads 34 and 40, and also provides the necessary recording and output selection controls.

Two sets of cogged wheels 502 and 504, and two TAKE buttons 506 and 508 are provided. The cogged wheels connect respectively to the two index registers associated with the head position logic, for example the index register 104 shown in FIG. 4. The number stored in either index register is the same as the number to which the corresponding set of cogged wheels 502 or 504 are set. The cogged wheels connect to a series of conventional rotary switches (not shown) that generate the voltages which represent the numbers within the index registers.

The TAKE buttons are mechanically connected to the two head position switches associated with the head position logic, for example the switch 106 shown in FIG. 4. Depression of either TAKE buttons 506 or 508 causes the corresponding head 40 or 54 to move into a position opposite the image whose index number appears upon the corresponding set of cogged wheels 502 or 504. For example, when the take button 502 is depressed, the head 40 moves into position before the image having the index number "278." This number appears upon the set of cogged wheels 502. When the TAKE button 504 is depressed, the head 34 moves into position before the image having the index number 000. This number appears upon the set of cogged wheels 504.

The TAKE buttons 506 and 508 may be equipped with lights that become illuminated whenever the corresponding head 40 or 34 reaches the proper position. Additional contacts on the relays associated with the head position logic 69, such as the relay 112 shown in FIG. 4, can be used to control the TAKE button lights.

Two PLAY buttons 510 and 512 also provided, one corresponding to each of the two heads 40 and 34. The PLAY buttons actuate the switch 64 shown in FIG. 1. When the PLAY buttons 510 is depressed, the switch 64 connects the output 62 to the amplifier 56 that receives signals from the playback head 40. When the PLAY button 512 is depressed, the switch 64 connects the output 62 to the amplifier 54 that receives signals from the record-playback head 34. As discussed previously, the switch 64 is preferably a fast acting electronic switch and is controlled to change from one video image to the other during the vertical retrace period of the new image. The two PLAY buttons 510 and 512 may also be illuminated to show which head is currently connected to the output 64.

The RECORD buttons 514 and 516 are also provided. These two buttons may be mechanically interlocked so that they must both be pressed before any recording takes place. This will prevent accidental erasure. The RECORD buttons 514 and 516 actuate the switches 36, 37 and 28, all of which are shown in FIG. 1. The record buttons 514 and 516 also may be illuminated to indicate when a new image has been successfully recorded.

FIG. 6 shows one possible drum speed logic circuit 72 that can be used to control the speed of rotation and phase of the magnetic drum 38. The drum rotation sensor 70 generates a first pulse signal 120 that transmits two pulses with each revolution of the drum 38, and a second pulse signal 122 that transmits 525 pulses with each revolution of the drum 38. The first pulse signal 120 is fed into a vertical phase detector 126, and the second pulse signal 122 is fed into a horizontal phase detector 125. Vertical synchronizing pulses from the sync processor circuit 78 are fed into the vertical phase detector 126, and horizontal sync pulses from the sync processor 78 are fed into the horizontal phase detector 125. The error signals generated by the detectors 125 and 126 are then combined and amplified in a servoamplifier 79. This servoamplifier then adjusts the precise speed of the drum drive motor 80, and thus controls the rotation of the drum 38. In this connection it will be understood that the circuit 72 is shown merely by way of example and other forms of logic circuitry suitable for controlling rotation of the drum 38 may be employed. For example, logic circuitry similar to arrangement presently employed to control tape speed drives in video tape recorders, and the like, may be employed.

Figure 7:
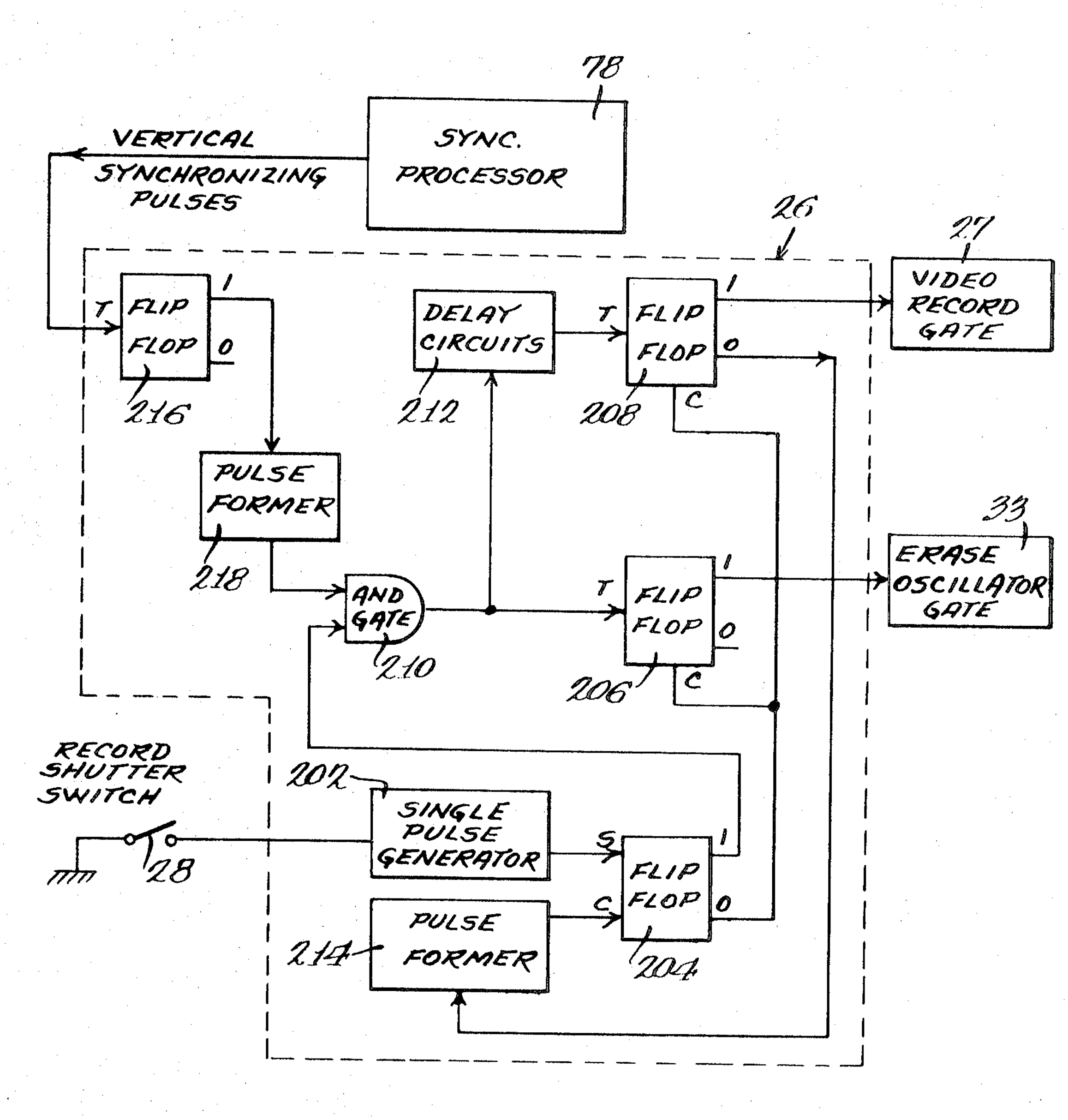
FIG. 7 is a block diagram showing the circuitry which is employed in recording a video image signal on the drum of the apparatus shown in FIG. 1.

FIG 7 illustrates a suitable gate timing control logic circuit 26. The logic circuit 26 includes a single pulse generator 202, four flip-flops 204, 206, 208 and 216 and AND gate 210, a delay circuit 212 and two pulse formers 214 and 218.

The single pulse generator 202 can be a Schmitt trigger connected to a pulse generator, or any other circuit that can generate a pulse when an input lead is grounded. The flip-flops 204, 206, 208 and 216 are of conventional design. Some are equipped with set or "S" and clear or "C" terminals, while others are equipped with a trigger or "T" terminal. A "1" level signal applied to a set or "S" terminal places to a flip-flop in the "1" "1" level potential to appear at the "1" output terminal A "1" level signal applied to a clear or "C" terminal places a flip-flop in the "0" state, and causes a "0" level signal to appear at the "1" output terminal. A "1" level signal applied to the trigger of "T" input of a flip-flop causes the flip-flop to change its state; if the flip-flop was previously in the "0" state, it shifts into the "1" state, and vice versa. The "0" output terminal always carries a potential that is the inverse of that carried by the "1" output terminal, in accordance with the usual practice.

The AND gate 210 produces a "1" level output potential if and only if "1" level signals are present at both input terminals. Otherwise the AND gate 210 produces a "0" level output potential. When a "1" level signal is applied to one input, the AND gate is said to be enabled, and the AND gate output potential will then follow the input potential at the remaining input.

The delay circuit 212 can be a one-shot multivibrator, a delay line, or any other suitable arrangement that can produce a delayed output.

The pulse formers 214 and 218 are simply resistor-capacitator pulse forming circuits of conventional design. Any circuit that produces a "1" level output pulse in response to a shift in input potential from the "0" level to the "1" level can be used.

The gate timing control logic 26 functions in the following manner. When the record shutter switch 28 is closed, the single pulse generator 202 generates a "1" level pulse and applies the pulse to the set or "S" terminal of the flip-flop 204. The flip-flop 204 switches into the "1" state and enables the AND gate 210 by applying a "1" level signal to one of the two AND gate inputs.

The remaining input to the AND gate 210 is connected to the "1" output terminal of the flip-flop 216 by a pulse former 218. Vertical synchronizing pulses from the sync processor 78 are fed to the trigger or "T" input of the flip-flop 216, and the flip-flop 216 changes its state with the appearance of each vertical synchronizing pulse. Whenever the flip-flop 216 shifts from the "0" state into the "1" state, the potential at the input to the pulse former 218 changes from the "0" potential level to the "1" potential level, and a "1" level pulse is generated by the pulse former 218 and applied to the remaining input to the AND gate 210. Thus, every other vertical synchronizing pulse will cause the pulse former 218 to feed a "1" level pulse to the AND gate 210. The resulting chain of pulses flowing from the pulse former 218 will contain one pulse for every complete interlaced video image.

Since the AND gate 210 is now enabled, the next pulse from the pulse former 218 passes through the AND gate 210 and triggers the flip-flop 206 into the "1" state. This same pulse is also applied to the delay circuit 212.

The flip-flop 206 closes the erase oscillator gate 33 by applying a "1" level signal to the gate 33. This initiates the erasure of the drum surface. Erasure continues for one revolution of the drum 38 (FIG. 1). The next pulse from the pulse former 218 triggers the flip-flop 206 back into the "0" state and opens the erase oscillator gate 33, terminating the erasure process.

The delay circuit 212 is necessary to insure that the flip-flop 208 is not triggered until some time after the flip-flop 206 is triggered. Flip-flop 208 controls the video record gate 27. The video record gate 27 cannot be allowed to close for a short time after the erase oscillator gate 33 closes, because the record-playback head 34 (FIG. 1) must be over a freshly erased portion of the magnetic drum 38 before the recording process begins. The exact amount of delay necessary will vary depending upon the spacing between the record-playback head 34 and the erase head 29.

The delayed output from the delay circuit 212 is applied to the trigger or "T" input of the flip-flop 208. The flip-flop 208 switches into the "1" state and closes the video record gate 27 by applying a "1" level signal to the gate 27. This initiates the recording process. Recording continues for one revolution of the drum 38. The next delayed pulse triggers the flip-flop 208 back into the "0" state and opens the video record gate 27.

When the flip-flop 208 returns to the "0" state, the input to the pulse former 214 shifts from the "0" potential level to the "1" potential level, and a "1" level pulse appears at the pulse former output. This pulse is applied to the clear or "C" terminal of the flip-flop 204, returning the flip-flop 204 to the "0" state. The flip-flop 204 disables the AND gate 210 by applying a "0" level signal to one AND gate input, and also applies a "1" level signal to the clear or "C" terminals of the flip-flops 206 and 208. The latter step insures that both of the flip-flops 206 and 208 end up in the "0" state, and also clears the various flip-flops when the image recorder is first turned on. The operation of the gate timing control logic circuit 26 is then completed.

In the present embodiment, the video record gate 27 is held closed for the time it takes to transmit a single complete video image. While this is desirable, it is also possible to leave the gate 27 closed for a slightly longer time, so that there is some overlap of signal on the drum surface, or open the gate 27 at a slightly earlier time leaving a blank section on the drum surface. In any given system, experiments will show how much latitude one may allow here without adversely affecting receiver synchronization.

While there has been described what is at present considered to be the preferred embodiment of the invention, it will be understood that various changes and modifications thereof will occur to those skilled in the art. It is intended to cover all such changes and modifications as fall within the true spirit and scope of the present invention in the appended claims.

What is claimed as new and desired to be secured by Letters Patent of the United States is:

What is claimed as new and desired to be secured by Letters Patent of the United States is:

1. An image recording and reproducing system comprising: a rotating magnetic recording surface; means for applying a plurality of single-frame video images to said surface in annular bands displaced from one another along said surface; a magnetic signal reproducing device mounted adjacent said surface and displaceable along a line intersecting said annular bands on said surface; indexing means for accurately positioning said magnetic signal reproducing device to reproduce a desired one of said plurality of magnetic video images; means for generating a code corresponding to the position of said reproducing device along said line; means for comparing said generated code with a reference code; and means for moving said reproducing device along said line on said surface until said codes agree.

2. An image reproducing device for rapidly and repetitively reproducing single-frame video images each including two interlaced fields, comprising a rotatable magnetic recording surface, means for rotating said surface so that it completes one revolution in the time it takes to transmit a complete single-frame video image, means for recording different single-frame video images in different annular bands on said surface with the vertical synchronizing pulses of said different images in alignment along said surface, a first reproducing head mounted for movement along a line corresponding to the position of the aligned vertical synchronizing pulses of one field of said single-frame images at a particular position of said surface and a second reproducing head mounted for movement along a line corresponding to the position of the aligned vertical synchronizing pulses of the other field of said single-frame images at said position of said surface, means for selectively and independently positioning said first and second reproducing heads in operative relation to any one of said annular bands, an output terminal to which it is desired selectively to transmit said different video images, and switching means for selectively connecting either of said first and second reproducing heads to said output terminal to repetitively reproduce a given one of said images while positioning the other of said head in alignment with a different band corresponding to a different one of said video images.

3. The arrangement set forth in claim 2, wherein said selective positioning means includes means for generating a first signal corresponding to a desired position of one of said reproducing heads, means for developing a second signal corresponding to the actual position of said one reproducing head, means for comparing said first and second signals to develop an error signal, and means utilizing said error signal to move said one head to said desired position.

4. The arrangement set forth in claim 2, wherein said selective positioning means includes means for generating a code corresponding to a desired position of one of said reproducing heads, means for driving one head along said line and developing pulses corresponding to a predetermined increment of movement of said one head, a counter, means for supplying said developed pulses to said counter to change the setting thereof in accordance with movement of said one head, code comparing means for comparing said generated code an the setting of said counter, and means controlled by said comparing means for stopping said driving means when said one head is driven to said desired position.

5. The arrangement set forth in claim 4, which includes means connected to said one head and responsive to the maximum signal reproduced therefrom for controlling said driving means to position said one head in maximum signal developing relation to the recorded video image at the desired position of said generated code.

5. The arrangement set forth in claim 4, which includes means connected to said one head and responsive to the maximum signal reproduced therefrom for controlling said driving means to position said one head in maximum signal developing relation to the recorded video image at the desired position of said generated code.

6. An image recording and reproducing system comprising: a rotating magnetic storage drum; means for applying a plurality of single-frame video images to the surface of said drum in circumferential bands axially displaced from one another along the surface of said drum; a magnetic signal reproducing device mounted adjacent the surface of said drum and axially displaceable across the surface of said drum; indexing means for accurately positioning said magnetic signal reproducing device to reproduce a desired one of said plurality of magnetic video images; means for generating a code corresponding to the positioning of the reproducing device; means for comparing said generated code with a reference code; and means for moving said reproducing device axially along the surface of the cylinder until said codes agree.

7. The image recording and reproducing system of claim 6 in which said means for generating a code corresponding to drum positioning comprises a plurality of different magnetic index marks located on a surface of said drum, one of said index marks corresponding to each of said image storage locations, and means positionable with said magnetic signal reproducing device for detecting said index marks.